US012591767B2

(12) United States Patent
Jiao et al.

(10) Patent No.: US 12,591,767 B2
(45) Date of Patent: Mar. 31, 2026

(54) NEURAL NETWORK ACCELERATION CIRCUIT AND METHOD

(71) Applicant: SHENZHEN CORERAIN TECHNOLOGIES CO., LTD., Guangdong (CN)

(72) Inventors: Li Jiao, Guangdong (CN); Yuanchao Li, Guangdong (CN); Kuen Hung Tsoi, Guangdong (CN); Xinyu Niu, Guangdong (CN)

(73) Assignee: SHENZHEN CORERAIN TECHNOLOGIES CO., LTD., Guangdong (CN)

( * ) Notice: Subject to any disclaimer, the term of this patent is extended or adjusted under 35 U.S.C. 154(b) by 958 days.

(21) Appl. No.: 17/786,650

(22) PCT Filed: Dec. 16, 2020

(86) PCT No.: PCT/CN2020/136842
§ 371 (c)(1),
(2) Date: Jun. 17, 2022

(87) PCT Pub. No.: WO2021/121274
PCT Pub. Date: Jun. 24, 2021

(65) Prior Publication Data
US 2023/0036414 A1 Feb. 2, 2023

(30) Foreign Application Priority Data
Dec. 17, 2019 (CN) .......................... 201911302604.0

(51) Int. Cl.
*G06N 3/063* (2023.01)
(52) U.S. Cl.
CPC .................................... *G06N 3/063* (2013.01)
(58) Field of Classification Search
CPC .................................................... G06N 3/063
(Continued)

(56) References Cited

U.S. PATENT DOCUMENTS

2005/0102446 A1* 5/2005 Togo ................... G06F 15/7832
711/100
2010/0030716 A1 2/2010 Calise et al.
(Continued)

FOREIGN PATENT DOCUMENTS

CN 108171317 A 6/2018
CN 108780524 A 11/2018
(Continued)

OTHER PUBLICATIONS

FPGA—accelerated deep convolutional neural networks for high throughput and energy efficiency, by Qiao et al (Year: 2016).*
(Continued)

*Primary Examiner* — Austin Hicks
(74) *Attorney, Agent, or Firm* — Maier & Maier, PLLC

(57) ABSTRACT

Provided are a neural network acceleration circuit and method. The neural network acceleration circuit includes a data storage module, a data cache module, a computing module, and a delay processing module. The data storage module is configured to store input data required for a neural network computation. The data cache module is configured to cache input data output by the data storage module and required for the neural network computation. The computing module includes multiple computing units configured to compute input data output by the data cache module and required for the neural network computation so that multiple groups of output data are obtained. The delay processing module is configured to perform delay processing on the multiple groups of output data separately and output the multiple groups of output data subjected to the delay processing at the same time.

5 Claims, 2 Drawing Sheets

(58) Field of Classification Search
USPC ........................................................... 706/33
See application file for complete search history.

(56) References Cited

U.S. PATENT DOCUMENTS

| | | | | |
|---|---|---|---|---|
| 2010/0195429 | A1* | 8/2010 | Sonoda ................. | G11C 11/406 |
| | | | | 365/194 |
| 2012/0026811 | A1* | 2/2012 | Aoki .............. | G01R 31/318541 |
| | | | | 365/189.17 |
| 2015/0324684 | A1 | 11/2015 | Alvarez-Icaza Rivera et al. | |

FOREIGN PATENT DOCUMENTS

| | | | |
|---|---|---|---|
| CN | 109615069 | A | 4/2019 |
| CN | 110555516 | A | 12/2019 |
| CN | 110956258 | A | 4/2020 |

OTHER PUBLICATIONS

PCT/CN2019/136842 International Search Report dated Mar. 22, 2021.

* cited by examiner

NEURAL NETWORK ACCELERATION CIRCUIT AND METHOD

CROSS-REFERENCE TO RELATED APPLICATIONS

This is a National Stage Application filed under 35 U.S.C. 371 based on International Patent Application No. PCT/CN2020/136842, filed on Dec. 16, 2020, which claims priority to Chinese Patent Application No. 201911302604.0 filed on Dec. 17, 2019, the disclosures of both of which are incorporated herein by reference in their entireties.

TECHNICAL FIELD

Embodiments of the present application relate to the field of neural networks, for example, a neural network acceleration circuit and method.

BACKGROUND

In recent years, neural networks have developed rapidly and are widely used in computer vision and natural language computing. Neural network accelerators having the characteristics of high energy efficiency and large-scale parallel computations become a hot research topic gradually.

The neural network acceleration circuit typically uses a high degree of parallelism for quickly completing massive computing tasks required by a neural network algorithm. Due to the regularity of a computing form, the acceleration circuit first designs a basic computing unit which is used for implementing basic operations in the algorithm, and then the acceleration circuit copies the computing unit massively to achieve a high degree of computation parallelism. FIG. 1 shows the structure of a typical neural network acceleration circuit, where an input data random-access memory (RAM) and a weight data RAM output a large amount of data per cycle, and the data is distributed to each computing unit for a computation through a data distributor. For example, the data distributor includes an input/output interconnection module formed by a selector unit. Depending on different manners of parallel computations, the same input data or the same weight are usually multiplexed between computing units. Thus, in the circuit, output data of a certain module is directly connected to multiple other modules at the same time.

This neural network acceleration circuit requires that the data output from the input data RAM and the weight data RAM reaches all computing units at the same time in the same clock cycle. When the computing units have a relatively high degree of parallelism, some computing units may be placed at a distance from the input data RAM and the weight data RAM, and corresponding data requires more time for reaching these computing units, thereby resulting in that these relatively long wires will cause setup time of a signal not to be satisfied when a clock frequency is relatively high. Thus, the highest clock frequency at which the circuit can work is limited. However, if the circuit is enabled to work at the relatively high clock frequency, timing requirements limit a degree of computation parallelism of the circuit.

SUMMARY

Embodiments of the present application provide a neural network acceleration circuit and method, so as to avoid a conflict between a timing and a degree of computation parallelism in the neural network acceleration circuit so that the neural network acceleration circuit working at a relatively high clock frequency can also have a relatively high degree of computation parallelism.

In a first aspect, an embodiment of the present application provides a neural network acceleration circuit which includes a data storage module, a data cache module, a computing module, and a delay processing module.

The data storage module is configured to store input data required for a neural network computation.

The data cache module is configured to cache input data which is output by the data storage module and required for the neural network computation.

The computing module includes multiple computing units configured to compute input data which is output by the data cache module and required for the neural network computation to obtain multiple groups of output data.

The delay processing module is configured to perform delay processing on the multiple groups of output data separately and then the output multiple groups of output data subjected to the delay processing at the same time.

In a second aspect, an embodiment of the present application provides a neural network acceleration method. The method includes the steps described below.

Input data required for a neural network computation is acquired.

The input data is transmitted, according to a delay sequence, to multiple computing units successively for computations so that multiple groups of output data are obtained.

Delay processing is performed on the multiple groups of output data separately, and then the multiple groups of output data subjected to the delay processing are output at the same time.

DETAILED DESCRIPTION

Figures 1, 2:
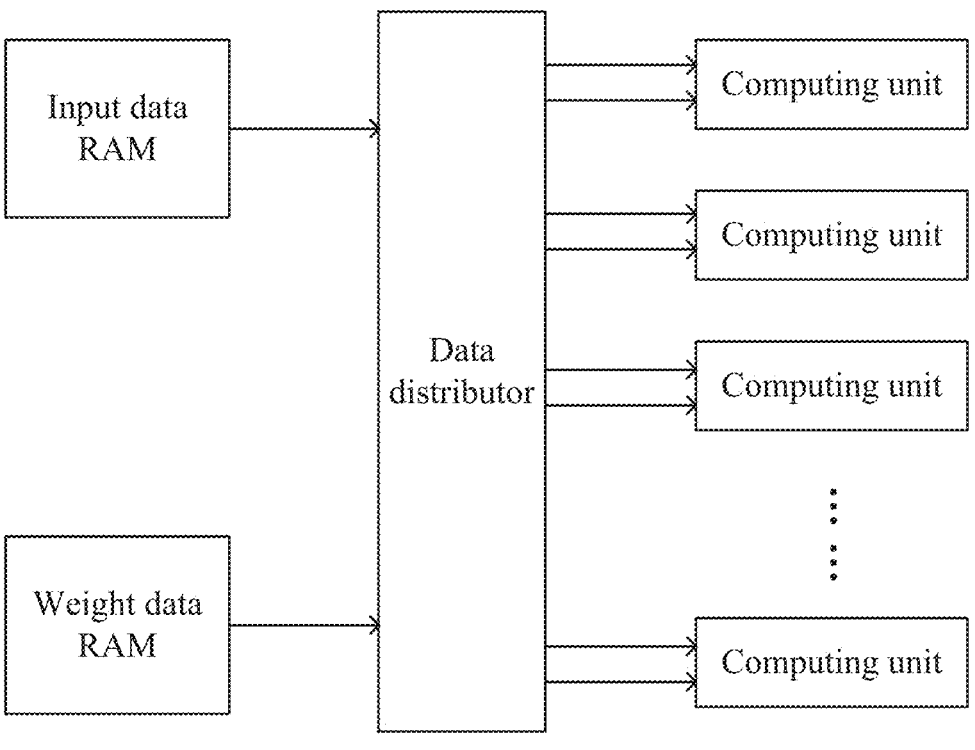
FIG. 1 is a structural diagram of a neural network acceleration circuit in the related art.
FIG. 2 is a structural diagram of a neural network acceleration circuit according to embodiment one of the present application.

Before exemplary embodiments are discussed in more detail, it is to be noted that some of the exemplary embodiments are described as computations or methods depicted in flowcharts. Although a flowchart describes steps as sequential computations, many of the steps may be performed concurrently, coincidently, or simultaneously. Additionally, the sequence of the steps may be rearranged. The computations may be terminated when operations of the computations are completed. However, the computations may further have additional steps not included in the drawing. The computations may correspond to a method, a function, a procedure, a subroutine, a subprogram, or the like.

Furthermore, the terms "first", "second", and the like may be used herein to describe various directions, actions, steps, elements, or the like, but these directions, actions, steps, or elements are not limited by these terms. These terms are only used for distinguishing a first direction, action, step, or element from another direction, action, step, or element. For example, without departing from the scope of the present application, a first data storage unit may be referred to as a second data storage unit, and similarly, the second data storage unit may be referred to as the first data storage unit. Both the first data storage unit and the second data storage unit are data storage units, but they are not the same data storage unit. Terms like "first" and "second" are not to be construed as indicating or implying relative importance or implicitly indicating the number of technical features as indicated. Thus, a feature defined as a "first" feature or a "second" feature may explicitly or implicitly include one or more of such features. As described herein, the term "a plurality of" is defined as at least two, for example, two, three, or the like, unless otherwise expressly and specifically limited.

Embodiment One

FIG. 2 is a structural diagram of a neural network acceleration circuit according to embodiment one of the present application. The circuit is applicable to neural network computations. As shown in FIG. 2, a neural network acceleration circuit provided in embodiment one of the present application includes a data storage module 100, a data cache module 200, a computing module 300, and a delay processing module 400.

The data storage module 100 is configured to store input data required for a neural network computation. A neural network is a complex network system formed by extensive interconnections between a large number of simple processing units (also referred to as neurons), which reflects many essential features of human brain functions and is a highly complex nonlinear dynamic learning system. The neural network computation usually requires a large amount of input data which is stored by the data storage module 100 in the neural network acceleration circuit.

The data cache module 200 is configured to cache input data which is output by the data storage module and required for the neural network computation. When the computation needs to be performed, input data read from the data storage module 100 is first cached by the data cache module 200, and the computing module 300 directly obtains, from the data cache module 200, the input data required for the neural network computation. Delays exist between the input data which is required for the neural network computation and transmitted by the data storage module 100 to the data cache module 200. Apparently, data which is output by the data storage module 100 early reaches the data cache module 200 early while data which is output by the data storage module 100 late reaches the data cache module 200 late.

The computing module 300 includes multiple computing units configured to compute input data which is output by the data cache module and required for the neural network computation, so as to obtain multiple groups of output data. The computing module 300 includes the multiple computing units, and the number of computing units reflects a degree of computation parallelism of the neural network. The larger the number of computing units is, the higher the degree of computation parallelism of the neural network is. After one computing unit computes the input data, one group of output data may be obtained. Therefore, after the computing module 300 computes the input data, multiple groups of output data may be obtained. Time required by each computing unit of the computing module 300 for acquiring the input data from the data cache module 200 is the same, and the neural network acceleration circuit working at a relatively high clock frequency may still have a relatively high degree of computation parallelism. For example, the computing unit includes a multiplier and an adder.

The delay processing module 400 is configured to perform delay processing on the multiple groups of output data separately and then output multiple groups of output data subjected to the delay processing at the same time. Since delays in timings exist between the input data which is required for the neural network computation and transmitted by the data storage module 100 to the data cache module 200. Correspondingly, delays in timings also exist between input data which is obtained from the data cache module 200 by each computing unit of the computing module 300, thereby causing delays between the multiple groups of output data computed by the computing module 300. Generally, a neural network accelerator needs to output all output data at the same time so that it can be ensured that spatial positional relationships between the output data are not changed when the output data is stored. The computing module 300 transmits the output data to the delay processing module 400, and the delay processing module 400 performs the delay processing on the multiple groups of output data separately. The delay processing module 400 delays output data computed by the computing module 300 early for a relatively long time while the delay processing module 400 delays output data computed by the computing module 300 late for a relatively short time. Thus, all output data computed by the computing module 300 is finally in the same clock cycle, and the delay processing module 400 outputs all the output data at the same time. For example, the delay processing module 400 includes a shift register. In the neural network acceleration circuit provided in embodiment one of the present application, the data storage module is configured to store the input data required for the neural network computation; the data cache module is configured to cache the input data which is output by the data storage module and required for the neural network computation; the computing module includes the multiple computing units configured to compute the input data which is output by the data cache module and required for the neural network computation to obtain the multiple groups of output data; and the delay processing module is configured to perform the delay processing on the multiple groups of output data separately and then output the multiple groups of output data subjected to the delay processing at the same time. The neural network acceleration circuit provided in the embodiment of the present application avoids a conflict between a timing and the degree of computation parallelism in the neural network acceleration circuit so that the neural network acceleration circuit working at the relatively high clock frequency can also have the relatively high degree of computation parallelism. Thus, the computing capability of the neural network acceleration circuit is improved.

Embodiment Two

Figure 3:
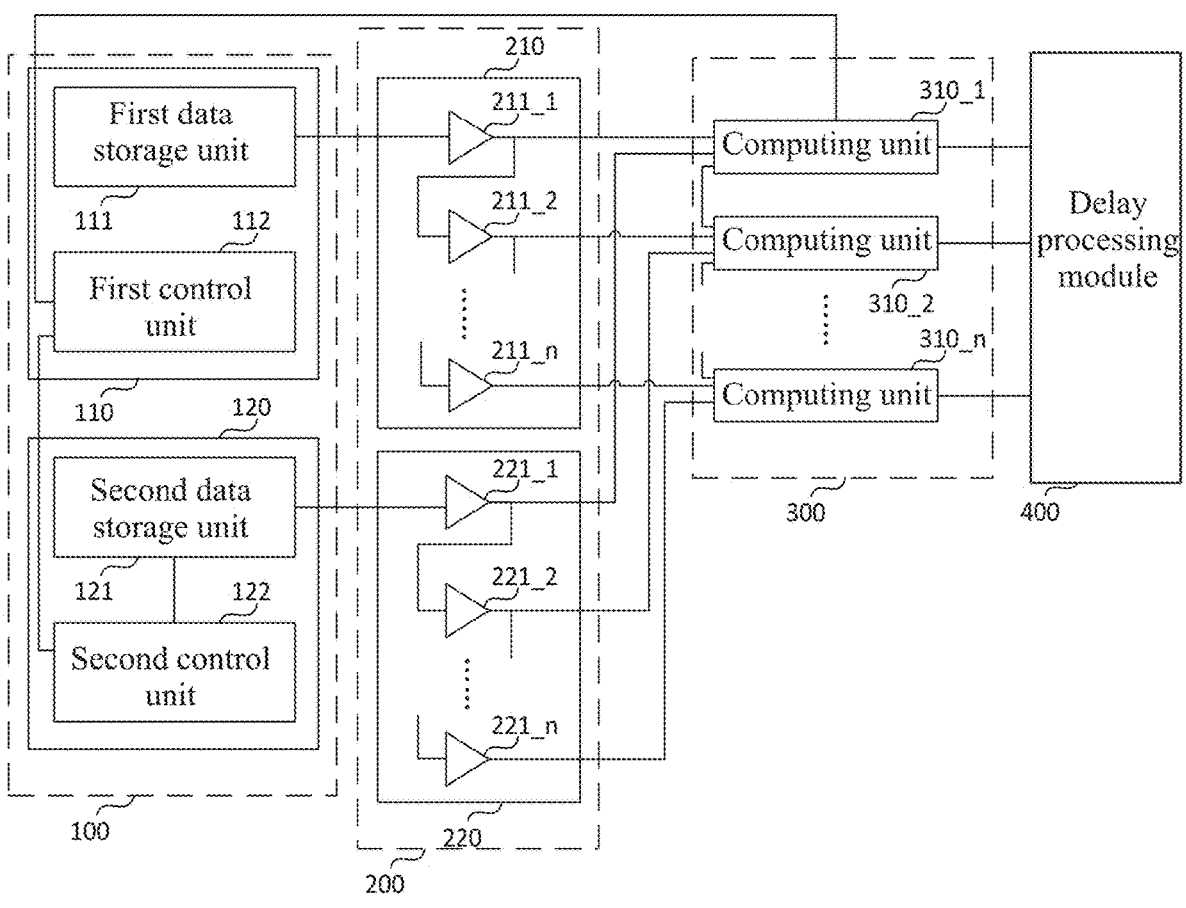
FIG. 3 is a structural diagram of a neural network acceleration circuit according to embodiment two of the present application.

FIG. 3 is a structural diagram of a neural network acceleration circuit according to embodiment two of the present application. This embodiment refines the preceding embodiment. As shown in FIG. 3, a neural network acceleration circuit provided in embodiment two of the present application includes a data storage module 100, a data cache module 200, a computing module 300, and a delay processing module 400. The data storage module 100 includes a first data storage sub-module 110 and a second data storage sub-module 120, where the first data storage sub-module

110 includes a first data storage unit 111 and a first control unit 112, and the second data storage sub-module 120 includes a second data storage unit 121 and a second control unit 122. The data cache module 200 includes a first register unit 210 and a second register unit 220, where the first register unit 210 includes n first registers 211_1 to 211_n, and the second register unit 220 includes n second registers 221_1 to 221_n. The computing module 300 includes n computing units 310_1 to 310_n. For example, the first control unit 112 and the second control unit 122 each include a condition determination and selection logic circuit formed by an AND-OR gate.

The n first registers 211_1 to 211_n of the first register unit 210 are successively connected in series, and the n second registers 221_1 to 221_n of the second register unit 220 are successively connected in series. The computing units 310_1 to 310_n are connected to and in one-to-one correspondence with the first registers 211_1 to 211_n, that is, a first computing unit 310_1 is connected to a first one 211_1 of the first registers, and an i-th computing unit 310_i is connected to an i-th one 211_i of the first registers (i≤n). The computing units 310_1 to 310_n are also connected to and in one-to-one correspondence with the second registers 221_1 to 221_n, that is, the first computing unit 310_1 is connected to a first one 221_1 of the second registers, and the i-th computing unit 310_i is connected to an i-th one 221_i of the second registers (i≤n). In a real hardware device, a distance between the i-th computing unit 310_i and the i-th one 211_i of the first registers should be ensured to be equal to a distance between the i-th computing unit 310_i and the i-th one 221_i of the second registers. Thus, time at which the i-th computing unit 310_i acquires data from the i-th one 211_i of the first registers can be ensured to be the same as time at which the i-th computing unit 310_i acquires data from the i-th one 221_i of the second registers.

The first data storage unit 111 is configured to store first input data required for a neural network computation, the first data storage unit 111 is connected to the first register unit 210, and for example, the first data storage unit 111 is connected to the first one 211_1 of the first registers in the first register unit 210. The second data storage unit 121 is configured to store second input data required for the neural network computation, the second data storage unit 121 is connected to the second register unit 220, and for example, the second data storage unit 121 is connected to the first one 221_1 of the second registers in the second register unit 220.

When the neural network acceleration circuit provided in this embodiment is used for performing a computation, the first data storage unit 111 transmits the first input data to the first register unit 210, the transmitted first input data first reaches the first one 211_1 of the first registers, and the first one 211_1 of the first registers transmits the first input data to the first computing unit 310_1. In addition, the second data storage unit 121 transmits the second input data to the second register unit 220, the transmitted second input data first reaches the first one 221_1 of the second registers, and the first one 221_1 of the second registers transmits the second input data to the first computing unit 310_1. The first computing unit 310_1 computes the first input data and the second input data to obtain a first group of output data, where the first input data may be input data from a user, and the second input data may be weight data corresponding to the input data from the user when a neural network performs a convolution computation. Both the first data storage unit 111 and the second data storage unit 121 may be random-access memory (RAM) storage units.

After the first input data transmitted by the first data storage unit 111 reaches the first one 211_1 of the first registers, the first input data is further transmitted downward to a second one 211_2 of the first registers, and the second one 211_2 of the first registers transmits the first input data to a second computing unit 310_2. In addition, after the second input data transmitted by the second data storage unit 121 reaches the first one 221_1 of the second registers, the second register 221_1 performs the operation of shifting to the right first and then transmits the second input data downward to a second one 221_2 of the second registers, and the second one 221_2 of the second registers transmits the second input data to the second computing unit 310_2. The second computing unit 310_2 computes the first input data and the second input data to obtain a second group of output data. Thereafter, data is successively transmitted downward, the i-th one 211_i of the first registers transmits the first input data to the i-th computing unit 310_i, the i-th one 221_i of the second registers transmits the second input data to the i-th computing unit 310_i, and the i-th computing unit 310_i computes the first input data and the second input data to obtain an i-th group of output data. An (i−1)-th one 221_i−1 of the second registers performs the operation of shifting to the right first and then transmits the second input data to the i-th one 221_i of the second registers so that the second input data acquired by an (i−1)-th computing unit 310_i−1 is different from the second input data acquired by the i-th computing unit 310_i, that is, weight data acquired by each computing unit is relatively different.

Two conditions need to be satisfied for a computing unit to compute input data. One is that input data which can be computed is received, and the other is that the control signal of starting the computation is received. The first control unit 112 in the first data storage sub-module 110 is configured to send a control signal to the computing module 300. For example, the first control unit 112 sends out the control signal to the first computing unit 310_1 in the computing module 300. The first data storage unit 111 transmits the first input data to the first register unit 210, which indicates that the neural network acceleration circuit needs to be used for performing the computation in this case, and the first control unit 112 sends out the control signal to the first computing unit 310_1 in this case.

The second control unit 122 in the second data storage sub-module 120 is configured to send a control signal to the second storage unit 121, so as to control a data read and write operation of the second storage unit 121. The second control unit 122 sends out the control signal following the action of the first control unit 112. When the first control unit 112 sends out the control signal to the first computing unit 310_1, the second control unit 122 also sends out the control signal to the second storage unit 121 so that the second data storage sub-module 120 transmits the second input data to the second register unit 220 while the first data storage unit 111 transmits the first input data to the first register unit 210, thereby ensuring that the computing module 300 can acquire the first input data and the second input data at the same time.

After the first computing unit 310_1 receives the control signal, a control signal is sent out to the second computing unit 310_2 after a preset clock cycle. After the second computing unit 310_2 receives the control signal, a control signal is sent out to a third computing unit 310_3 after the preset clock cycle. Thereafter, a control signal continues to be sent out in this manner until an n-th computing unit 310_n receives a control signal. That is, after the (i−1)-th computing unit receives a control signal, a control signal is sent out to the i-th computing unit according to the preset clock cycle ($2\leq i\leq n$). The preset clock cycle may be a fixed clock cycle, for example, one clock cycle. Alternatively, the preset clock cycle may be adjusted according to a data transmission rate, so long as it is ensured that the computing unit can directly perform the computation after receiving the input data which can be computed.

From the preceding data transmission process, it can be seen that the n computing units 310_1 to **310_*n* in the computing module 300 do not start computations at the same time but in a time sequence. Thus, n groups of output data output by the n computing units 310_1 to 310_*n* also have a time sequence, which requires the delay processing module 400 to adjust timings of the n groups of output data output by the n computing units 310_1 to 310_*n***, so as to enable the neural network acceleration circuit to output the n groups of output data at the same time.

For example, it is assumed that the computing module 300 includes 64 computing units 310_1 to 310_64. Accordingly, the first register unit 210 includes 64 first registers 211_1 to 211_64, and the second register unit 220 includes 64 second registers 221_1 to 221_64. The first input data transmitted by the first data storage unit 111 to the first register unit 210 reaches the first computing unit 310_1 through the first one 211_1 of the first registers. In addition, the second input data transmitted by the second data storage unit 121 to the second register unit 220 reaches the first computing unit 310_1 through the first one 221_1 of the second registers. This process requires one clock cycle, and the first control unit sends the control signal to the first computing unit 310_1 in a first clock cycle. In a second clock cycle, the first input data is transmitted to the second one 211_2 of the first registers through the first one 211_1 of the first registers; the second computing unit 310_2 receives the first input data from the second one 211_2 of the first registers; the second input data is transmitted to the second one 221_2 of the second registers after the operation of shifting to the right by the first one 221_1 of the second registers; the second computing unit 310_2 receives the second input data from the second one 221_2 of the second registers; and the first computing unit 310_1 sends out the control signal to the second computing unit 310_2. By analogy, the i-th computing unit **310_*i* receives the input data and the control signal in an i-th clock cycle ($i\leq 64$) and starts the computation. The delay of one clock cycle exists between time at which the i-th computing unit 310_*i* and the (i–1)-th computing unit 310_*i*–1 receive the input data. After the (i–1)-th computing unit 310_*i*–1 receives the control signal, the control signal is sent to the i-th computing unit 310_*i* after one clock cycle, and a 64th computing unit 310_64** starts a computation in a 64th clock cycle.

Assuming that three clock cycles are required for completing a computing process of one computing unit, the first computing unit 310_1 outputs the first group of output data in a fourth clock cycle, the i-th computing unit **310_*i* outputs the first group of output data in an (i+3)-th clock cycle, and the 64th computing unit 310_64 outputs a 64th group of output data in a 67th clock cycle. To output all the output data at the same time, the delay processing module 400 delays the first group of output data output by the first computing unit 310_1 for 64 clock cycles, delays a second group of output data output by the second computing unit 310_2 for 63 clock cycles, and delays the i-th group of output data output by the i-th computing unit 310_*i* for (65–i) clock cycles, whereby the 64th group of output data output by the 64th computing unit 310_64** is delayed for one clock cycle. Thus, 64 groups of output data of the 64 computing units 310_1 to 310_64 are transmitted to the delay processing module 400, and the delay processing module 400 can output the 64 groups of output data at the same time.

Embodiment Three

Figure 4:
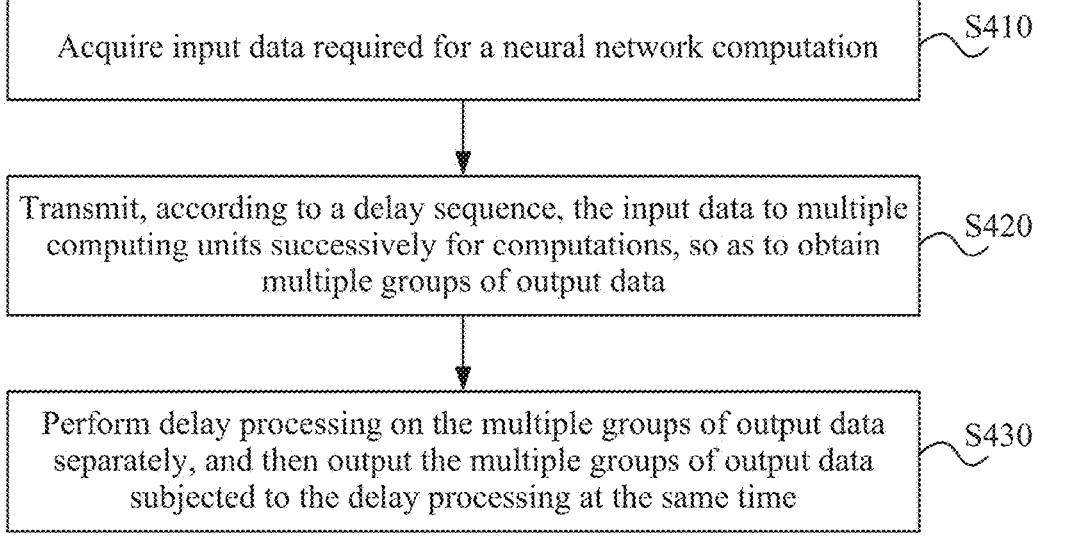
FIG. 4 is a flowchart of a neural network acceleration method according to embodiment three of the present application.

FIG. 4 is a flowchart of a neural network acceleration method according to embodiment three of the present application. The method is applicable to neural network computations. The neural network acceleration method provided in this embodiment may be implemented by the neural network acceleration circuit provided in any embodiment of the present application. For content not described in detail in embodiment three of the present application, reference may be made to the description in any other embodiment of the present application.

As shown in FIG. 4, the neural network acceleration method provided in embodiment three of the present application includes the steps described below.

In S410, input data required for a neural network computation is acquired.

A neural network is a complex network system formed by extensive interconnections between a large number of simple processing units (also referred to as neurons), which reflects many essential features of human brain functions and is a highly complex nonlinear dynamic learning system. Therefore, the neural network computation usually requires a large amount of input data.

The input data of the neural network includes first input data and second input data, where the first input data is input data from a user and the second input data is weight data corresponding to the input data from the user when the neural network performs a convolution computation.

The first input data of the neural network may be read from a first memory RAM (that is, a first data storage unit). The first memory is followed by multiple first registers successively connected in series. The second input data of the neural network may be read from a second memory RAM (that is, a second data storage unit). The second memory is followed by multiple second registers successively connected in series. The number of computing units, the number of first registers, and the number of second registers are the same, and one computing unit is connected to one first register and one second register so that the one computing unit can obtain the first input data from the one first register and the second input data from the one second register at the same time.

In S420, the input data is transmitted, according to a delay sequence, to multiple computing units successively for computations so that multiple groups of output data are obtained.

For example, the first input data read from the first memory RAM is successively transmitted to the multiple first registers successively connected in series. The multiple first registers successively connected in series transmit the first input data successively to correspondingly connected computing units. The second input data read from the second memory RAM is successively transmitted to the multiple second registers successively connected in series. The multiple second registers successively connected in series transmit the second input data successively to correspondingly connected computing units.

One computing unit performs one computation on the first input data and the second input data so that one group of output data can be obtained. Thus, the multiple computing units perform the computations so that the multiple groups of output data can be obtained.

In S430, delay processing is performed on the multiple groups of output data separately, and then the multiple groups of output data subjected to the delay processing are output at the same time.

For example, since the registers successively connected in series cause delays in timings between the input data acquired by each computing unit, delays in timings also exist between the multiple groups of output data computed by the multiple computing units. Output data computed early is delayed for a relatively long time, and output data computed late is delayed for a relatively short time so that all output data can be output at the same time at last.

According to the neural network acceleration method provided in embodiment three of the present application, the input data required for the neural network computation is acquired; the input data is transmitted, according to the delay sequence, to the multiple computing units successively for the computations so that the multiple groups of output data are obtained; and the delay processing is performed on the multiple groups of output data separately, and then the multiple groups of output data subjected to the delay processing are output at the same time. Thus, a conflict between a timing and a degree of computation parallelism in the neural network acceleration circuit is avoided so that the neural network acceleration circuit working at a relatively high clock frequency can also have a relatively high degree of computation parallelism, thereby improving the computing capability of the neural network acceleration circuit.

What is claimed is:

1. A neural network acceleration circuit, comprising:
a data storage module configured to store input data required for a neural network computation;
a data cache module configured to cache the input data required for the neural network computation output by the data storage module;
a computing module comprising a plurality of computing units, wherein the plurality of computing units is configured to compute the input data required for the neural network computation output by the data cache module to obtain a plurality of groups of output data; and
a delay processing module configured to perform delay processing on the plurality of groups of output data separately and output the plurality of groups of output data subjected to the delay processing at the same time;
wherein the data storage module comprises a first data storage sub-module and a second data storage sub-module, and the first data storage sub-module comprises a first data storage unit and a first control unit, wherein the first data storage unit is configured to store first input data required for the neural network computation, and the first control unit is configured to send a control signal to the computing module, the second data storage sub-module comprises a second data storage unit and a second control unit, wherein the second data storage unit is configured to store second input data required for the neural network computation and the second control unit is configured to control a read and write operation of the second data storage unit; the data cache module comprises a first register unit and a second register unit, wherein the first data storage unit is connected to the first register unit and the second data storage unit is connected to the second register unit; the first register unit comprises n first registers successively connected in series, and the second register unit comprises n second registers successively connected in series; the computing module comprises n computing units, an i-th computing unit is connected to an i-th first register of the n first registers, and the i-th computing unit is further connected to an i-th second register of the n second registers; the i-th first register of the n first registers transmits the first input data to the i-th computing unit, the i-th second register of the n second registers transmits the second input data to the i-th computing unit, and the i-th computing unit computes the first input data and the second input data to obtain an i-th group of output data, wherein $i \leq n$.

2. The circuit according to claim 1, wherein the first control unit is configured to send a control signal to a first computing unit of the computing module.

3. The circuit according to claim 2, wherein an $(i-1)$-th computing unit of the computing module sends a control signal to the i-th computing unit according to a preset clock cycle after the $(i-1)$-th computing unit receives the control signal, wherein $2 \leq i \leq n$.

4. The circuit according to claim 1, wherein the first data storage unit and the second data storage unit each is a random-access memory (RAM) storage unit.

5. A neural network acceleration method implemented by the neural network acceleration circuit according to claim 1, comprising: acquiring input data required for a neural network computation; transmitting, according to a delay sequence, the input data to a plurality of computing units successively for computations to obtain a plurality of groups of output data; and performing delay processing on the plurality of groups of output data separately, and outputting the plurality of groups of output data subjected to the delay processing at the same time.

* * * * *